(12) United States Patent
Tsegga et al.

(10) Patent No.: US 6,748,642 B2
(45) Date of Patent: Jun. 15, 2004

(54) PRELOADING FOR LOCKBOLT INSTALLATION

(75) Inventors: Mekonnen Tsegga, Lynnwood, WA (US); Kenneth R. Christie, Lynnwood, WA (US)

(73) Assignee: The Boeing Company, Seattle, WA (US)

(*) Notice: Subject to any disclaimer, the term of this patent is extended or adjusted under 35 U.S.C. 154(b) by 171 days.

(21) Appl. No.: 09/895,147

(22) Filed: Jun. 30, 2001

(65) Prior Publication Data

US 2003/0000063 A1 Jan. 2, 2003

(51) Int. Cl.[7] .......................... B21D 35/00; F16B 19/00
(52) U.S. Cl. .................... 29/469.5; 411/361; 29/525; 29/432.1; 29/505
(58) Field of Search .................. 29/469.5, 432.1, 29/505, 509, 525, 525.01–525.14, 283.5; 411/361

(56) References Cited

U.S. PATENT DOCUMENTS

| | | | | |
|---|---|---|---|---|
| 2,384,037 A | * | 9/1945 | Kugler | 29/243.526 |
| 3,215,024 A | * | 11/1965 | Brilmyer et al. | 411/361 |
| 3,232,162 A | * | 2/1966 | Ketchum | 29/243.522 |
| 3,309,911 A | * | 3/1967 | Simmons | 29/243.524 |
| 3,460,429 A | * | 8/1969 | Torre | 411/28 |
| 3,792,933 A | * | 2/1974 | Stencel | 403/19 |
| 3,962,775 A | * | 6/1976 | King, Jr. | 29/445 |
| 4,069,575 A | * | 1/1978 | Sigmund | 29/446 |
| 4,077,299 A | * | 3/1978 | King, Jr. | 411/339 |
| 4,221,152 A | | 9/1980 | Jason | |
| 4,347,728 A | | 9/1982 | Smith | |
| 5,090,852 A | * | 2/1992 | Dixon | 411/361 |
| 5,604,968 A | * | 2/1997 | Fulbright et al. | 29/407.05 |

\* cited by examiner

*Primary Examiner*—Peter Vo
*Assistant Examiner*—Stephen Kenny
(74) *Attorney, Agent, or Firm*—J. Michael Neary

(57) ABSTRACT

A process and apparatus for installation of a lockbolt to fasten together an assembly of at least two parts having a viscous fluid such as adhesive or sealant in the interface between the two parts, inserts a lockbolt into aligned holes through the two parts and exerts a pulling force of a predetermined intermediate magnitude on the lockbolt while reacting the pulling force against opposite sides of the assembly to exert a compressive force on the assembly to squeeze the fluid out of the interface. The intermediate pulling force is maintained for a precisely timed dwell period based on an optimal period for that fluid and that temperature. After the dwell period, the pulling force is increased in magnitude while simultaneously swaging a collar into threads on the lockbolt to secure the collar on the lockbolt and secure the lockbolt in a state of tension in the hole in the assembly. The pulling force magnitude continues to increase said until the pintail breaks off the lockbolt.

4 Claims, 11 Drawing Sheets

PRELOADING FOR LOCKBOLT INSTALLATION

This invention pertains to fastener installation, and more particularly to installation of lockbolts in assemblies having sealant or adhesive between the parts that must be squeezed out before the lockbolt is secured.

BACKGROUND OF THE INVENTION

Lockbolts have been used for many years, particularly in the aerospace industry, to fasten together assemblies of parts. A lockbolt is a high strength fastener capable of rapid installation, interference fit, low weight and repeatable installation parameters conducive to quality control documentation. Lockbolts are bolts, usually made of a titanium alloy such as 6AL-4V Titanium, having a head at a headed end and annular grooves adjacent the opposite (tail) end. A grooved "pintail" at the tail end of the fastener provides a gripping portion by which a lockbolt tool can grip the end of the fastener for applying a pulling force. A lockbolt is shown in U.S. Pat. No. 4,221,152, the disclosure of which is incorporated by reference Lockbolts are installed with a tool that pulls the lockbolt to the desired tensile preload and has a swage ring for swaging an aluminum collar onto the annular groves in the fastener tail for securing the fastener after it has been pulled tight. A narrow neck between the grooved tail and the pintail provides a fracture region designed to break at a predetermined force, about flush with the swage collar, allowing speedy removal of the tool to the next fastener location.

The lockbolt is a fast and reliable fastening system, but suffers from one disadvantage: after securing the swage collar, the fastener cannot be tightened further, or "retorqued", in the parlance of conventional helically threaded bolts and nuts. The grooves in the tail of a lockbolt are annular, not helical. The benefit provided by the annular grooves is that the collar cannot become loose by rotating under the influence of vibration the way a nut can, but if the collar was swaged prematurely, before proper pretension was established, it must be cut off and the lockbolt replaced to obtain a properly pretensioned fastener.

One circumstance in which the lockbolt swage collar occasionally is secured prematurely is when a viscous fluid sealant or adhesive is used in the interface between the two parts to be fastened together, as when they must produce a fluid-tight seal. One example in which sealant is used is in the wing fuel tanks of a commercial jet airplane for fluid-tight seals to prevent leakage of fuel. When an assembly is fastened together with a viscous fluid such as a sealant or adhesive in the interface, the lockbolt is pulled tight on the assembly, but a finite time is necessary before the viscous fluid can flow out of the interface under the pressure exerted by the pulling force of the fastener. This finite time varies, depending on the flow characteristics of the viscous fluid, the temperature, the spacing between adjacent fasteners, the thickness and stiffness of the part material, the pulling force, etc.

Recognizing that it was necessary to allow time for sealant and adhesive to be squeezed out of the interface, manufacturers of lockbolt equipment in the past have provided an intermediate force which mechanics can apply to the lockbolt, during which the sealant or adhesive could flow out of the interface, before application of the final pulling force ramp-up, leading to swaging the collar and fracture of the pintail. The mechanics were expected to operate the lockbolt installation equipment with a sufficient time delay between application of the intermediate pulling force on the lockbolt and the final ramp-up pulling force on the lockbolt leading to the pintail fracture. That time delay would depend on a number of factors, such as the type of sealant, the temperature, the proximity of the fastener hole to the edge of the part. etc.

An experienced mechanic has a remarkably sensitive ability to discern the correct amount of time to allow the sealant to squeeze out of the interface, and high quality assemblies have been consistently produced using the manual approach. However, the commitment of airplane mechanics to produce quality assemblies sometimes resulted in excessive delay times between the intermediate force and the final force ramp-up. Delay times on the order of a two seconds are usually appropriate, but an unusually quality conscientious mechanic would sometimes allow 3 or 4 seconds for sealant squeeze-out, which is more time than necessary. Management was reluctant to admonish such quality conscious mechanics to increase production speed for fear of sending the wrong message about quality vs. production rate, but at the same time management was concerned about excessive production time per operation.

As a consequence, the sealed assemblies produced using lockbolts have continued to be made with excellent quality but at a slower than optimal production rate. An enormous number of such fasteners is installed in a large assembly, such as an airplane wing, so those additional few seconds per fastener accumulates into a significant production time increase, and therefore cost increase, for that assembly. Thus, there has long been a need for a lockbolt installation system that automatically shifts from intermediate pressure to full pressure in the optimal time delay for sealant/adhesive to squeeze out of the interface, allowing full fastener preload to be maintained for the fastener.

SUMMARY OF THE INVENTION

Accordingly, this invention provides an improved process for installing lockbolts in assemblies having an interface between two parts in the assembly, with a viscous fluid substance such as an adhesive or sealant in the interface. The invention provides an improved apparatus for installing lockbolts in such assemblies such that an adjustable time delay is provide for exerting a partial fastener preload to allow for fluid squeeze-out before establishing full fastener preload and swaging of the lockbolt collar. The invention produces assemblies fastened at an economical production rate that have fasteners tensioned at the designated preload without relaxation therefrom by fluid squeeze-out.

These features and benefits are attained in a process and apparatus for installation of a lockbolt to fasten together an assembly of at least two parts having a viscous fluid such as adhesive or sealant in the interface between the two parts. A lockbolt is inserted into aligned holes through the two parts and tension is exerted on the lockbolt with a pulling force at a predetermined intermediate magnitude applied by the apparatus. The tension exerted on the lockbolt is reacted against opposite sides of the assembly to exert a compressive force on the assembly to squeeze the desired amount of the fluid out of the interface. The intermediate pulling force is maintained for a precisely timed dwell period based on an optimal period for that fluid and the ambient temperature. After the dwell period, the pulling force is increased in magnitude while simultaneously swaging a collar into threads on the lockbolt to secure the collar on the lockbolt and secure the lockbolt in a state of tension in the hole in the assembly. The pulling force magnitude continues to increase until the pintail breaks off the lockbolt.

DESCRIPTION OF THE DRAWINGS

The invention and its many attendant benefits and advantages will become better understood by reading the following detailed description of the preferred embodiment in conjunction with the following drawings, wherein.

DESCRIPTION OF A PREFERRED EMBODIMENT

Figure 1:
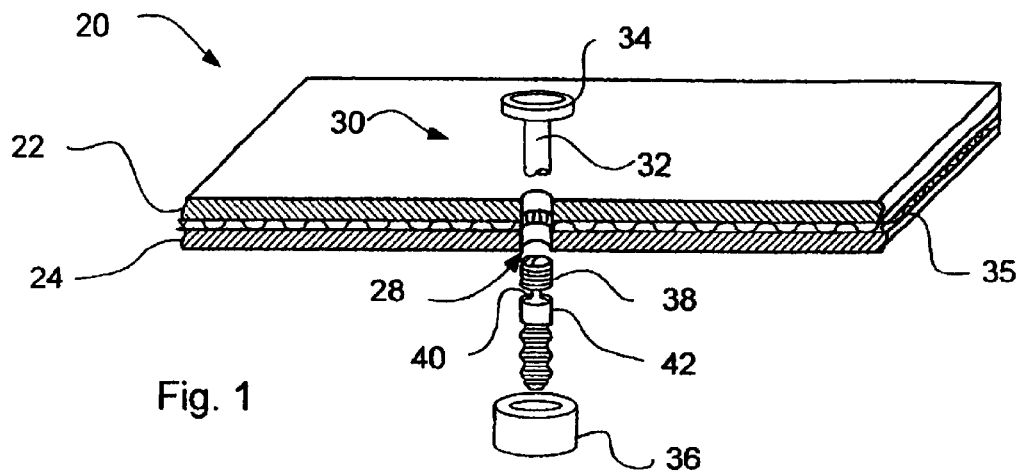
FIG. 1 is a sectional perspective, partially exploded view of a lockbolt, with the collar not yet swaged, in an assembly having sealant in the interface between two parts of the assembly

Turning now to the drawings, wherein like reference characters designate identical or corresponding parts, and more particularly to FIG. 1 thereof, an assembly 20 of two parts 22 and 24 is shown having a hole in each part. The holes are aligned to provide a through hole 28 in the assembly for receiving a lockbolt fastener 30. A layer 35 of viscous fluid material such a sealant or adhesive paste is applied to one or both faying surfaces of the parts 22 and 24 to bond and seal the interface therebetween. The fluid material 35 is typically applied to the top surface of the bottom part 24 before the top part 22 is placed on top of the bottom part 24.

The through hole 28 is drilled through the two parts 22 and 24, preferably after the parts have been assembled with the sealant 35 in the interface and clamped or otherwise held immobile while the hole is drilled. Of course, the usual assembly will have numerous holes, but the description of one will suffice for all of them. When drilling with sealant in the interface, the better practice is to clamp-up at the drilling location to prevent interlaminer burrs from intruding into the interface. When the parts are drilled separately or when they are match drilled and then separated for de-burring, the sealant is applied after the de-burring step.

Figure 2:
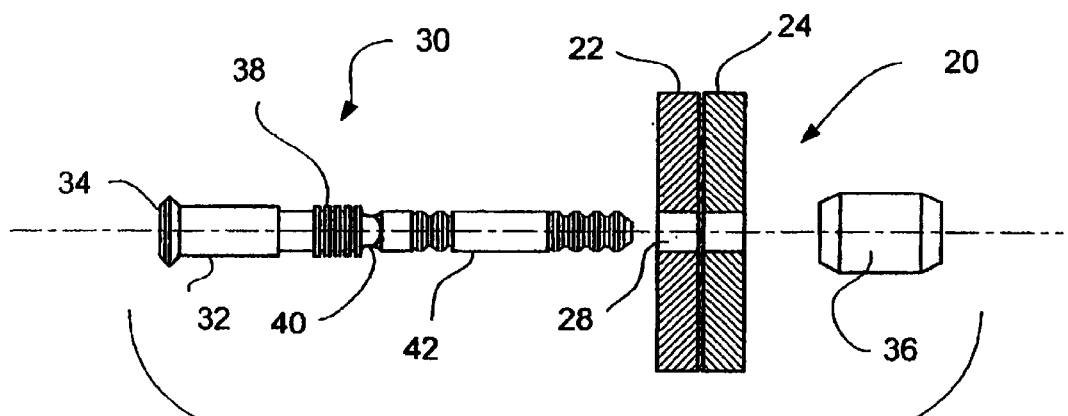
FIG. 2 is a sectional exploded elevation of a lockbolt and collar shown in FIG. 1.
Figure 3:
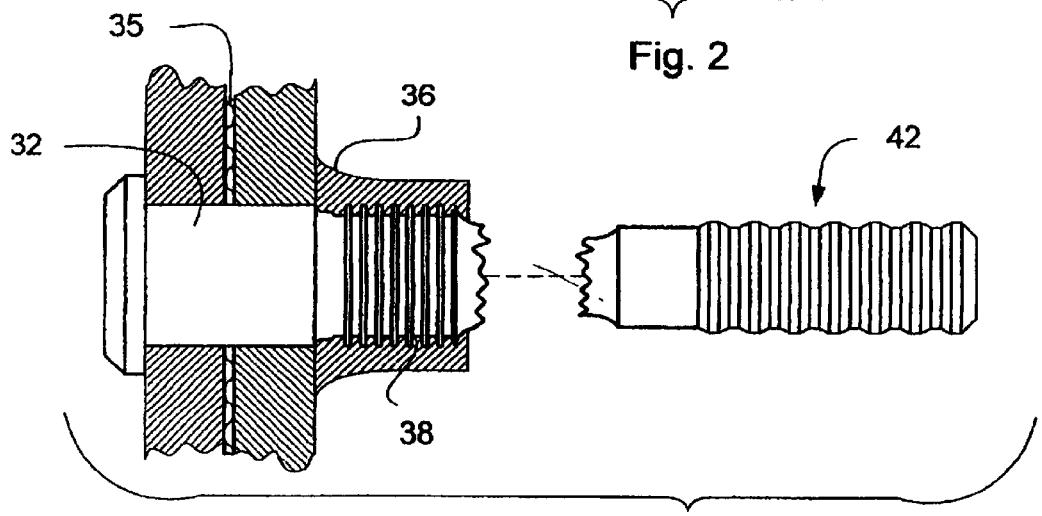
FIG. 3 is an enlarged sectional elevation of a lockbolt after swaging of the collar and breaking off the pintail.

As shown in FIG. 2, the lockbolt 30 may have a shank 32 sized slightly greater in diameter than the diameter of the fastener hole 28 so that the lockbolt has an interference fit in the hole 28. An interference fit fastener must be driven into the hole 28, thereby cold-working the hole margins for improved fatigue resistance. The lockbolt has a cylindrical or conical head 34 for exerting compressive force on one side of the assembly 20, and a collar 36 that is swaged onto an annular grooved section 38 contiguous with the shank 32, as shown in FIG. 3, for exerting a compressive force on the other side of the assembly 20 equal to the tensile preload in the shank 32. A grooved pintail 42 is joined to the annular grooved section 38 by way of a reduced breakneck 40. An installation tool 45, shown in FIG. 4, pulls on the lockbolt pintail 42 to preload the lockbolt in tension and put the assembly in compression. With the lockbolt held in tension, the tool 45 swages the collar 36 from its outer end onto the annular grooved section 38, and then breaks the pintail 42 off the annular grooved section 38, as shown in FIG. 3.

Figure 4:
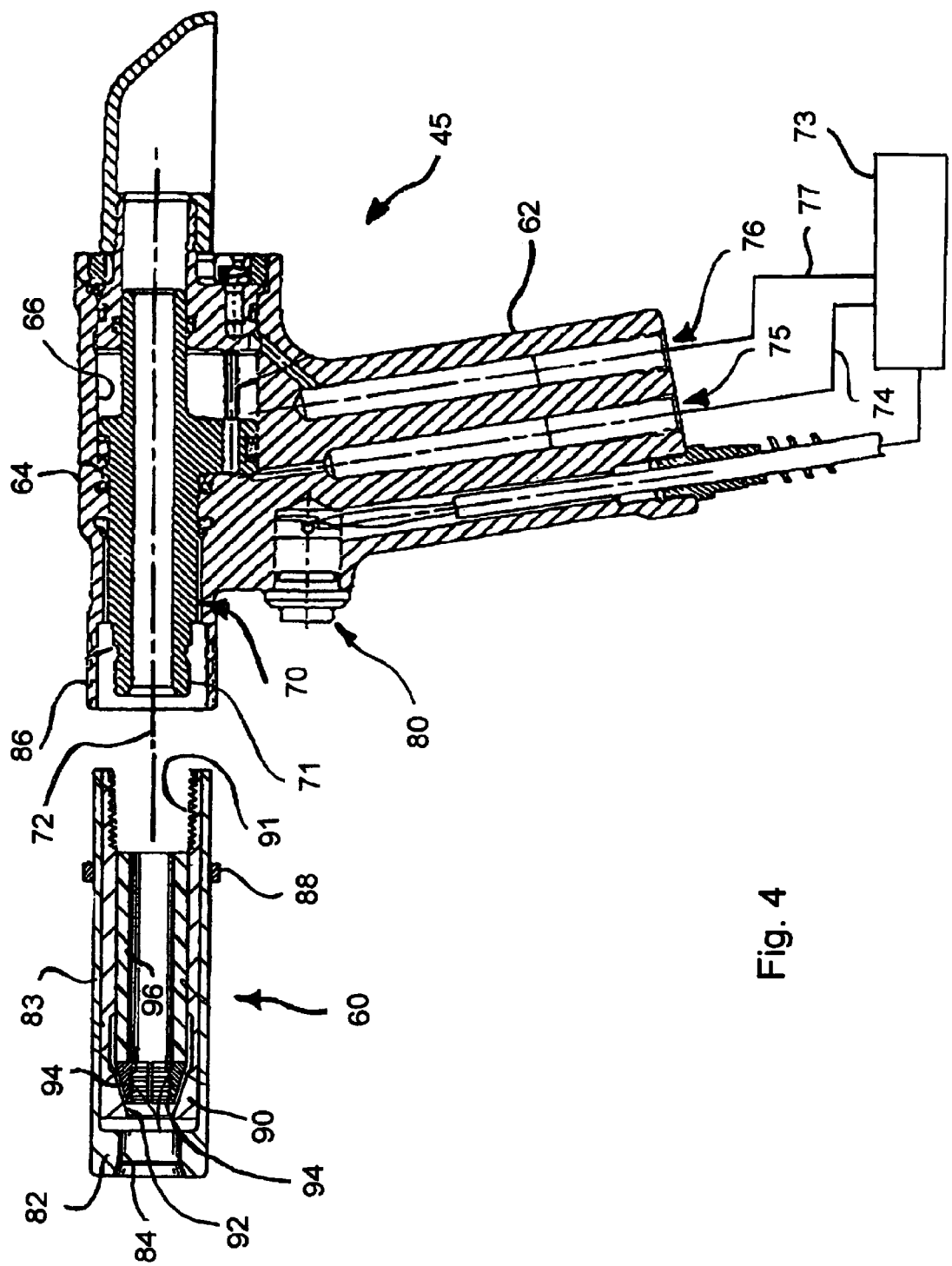
FIG. 4 is a sectional, partially exploded elevation of a hydraulic tool for preloading the lockbolts and swaging the collars.
Figure 5:
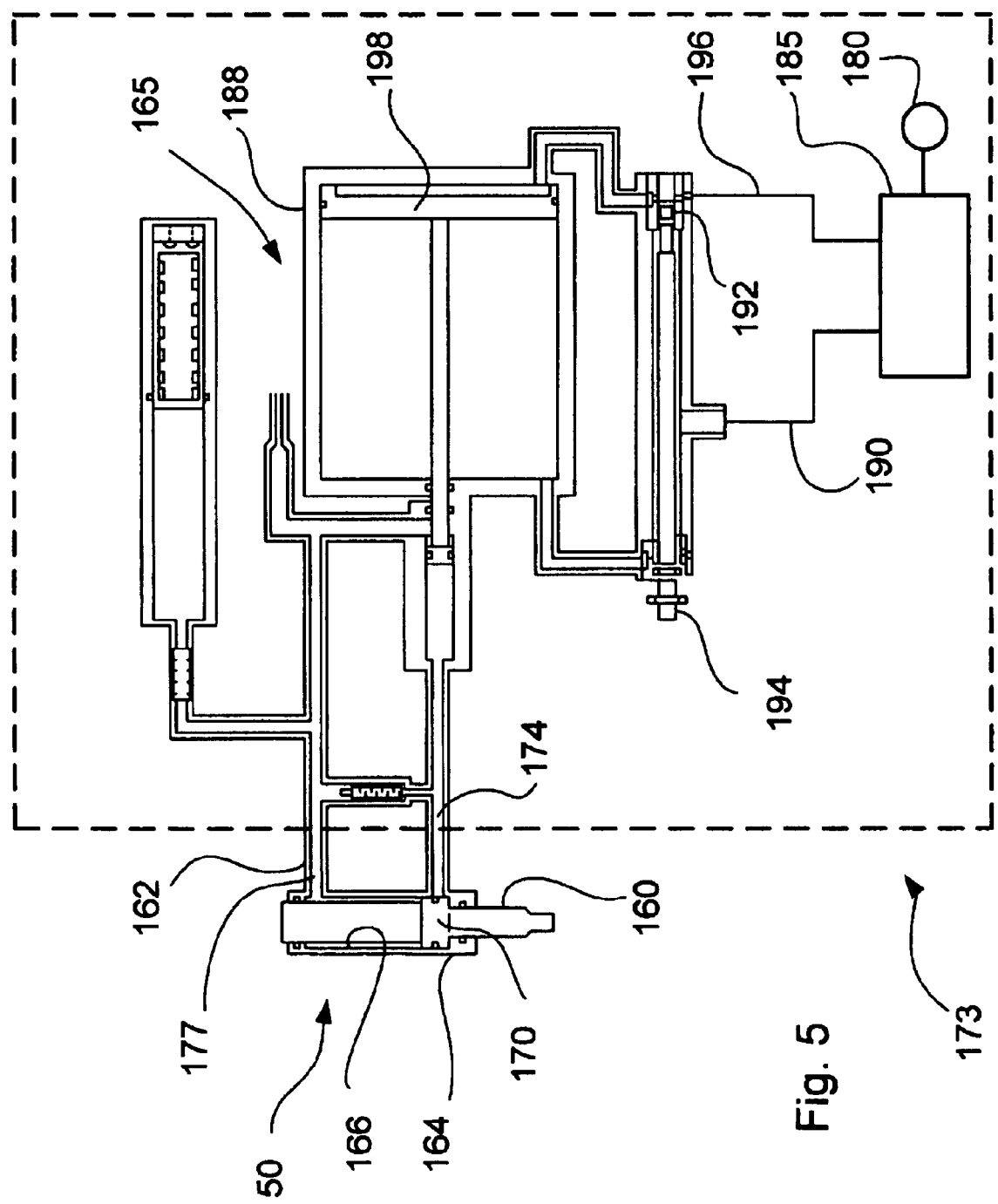
FIG. 5 is a schematic diagram of an air powered tool for preloading the lockbolts and swaging the collars.
Figure 6:
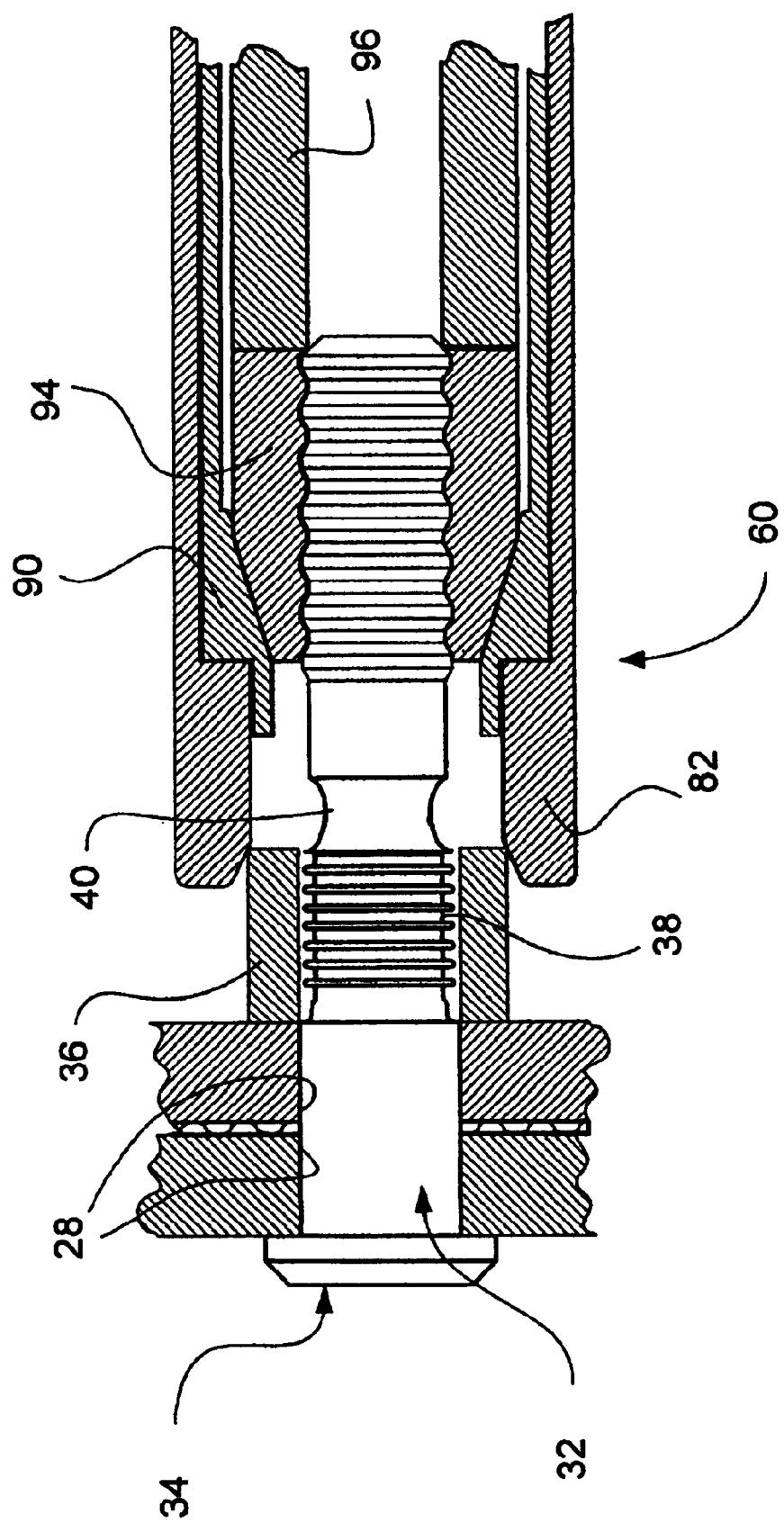
FIG. 6 is an enlarged sectional side elevation of a lockbolt gripped by a nose assembly of a pulling and swaging tool in preparation for pulling the lockbolt, swaging the collar and breaking the pintail.

Turning now to FIGS. 4 and 5, two installation tools 45 and 50 are shown for gripping the pintail 42 of the lockbolt 30 and exerting a pulling force while reacting the pulling force with a compressive and swaging force with a die 82 on a nose assembly 60 on the collar 36, as shown in FIG. 6. The tool 45, shown in FIG. 4, includes a body having a handle 62 and a barrel 64 enclosing a cylinder 66 in which a piston 70, externally threaded at its front end 71, moves along an axis 72 under influence of hydraulic fluid pressurized in a power unit 73. The fluid is admitted through a flexible, high-pressure hose 74 coupled to a fitting (not shown) attached to a first fluid passage channel 75 in the handle 62, and spent fluid is vented through a second fluid passage channel 76 and a sump hose 77 back to the power unit 73. Pressurized fluid flow to the cylinder through the first fluid passage channel 74 is controlled by the operator by a trigger 80 mounted on the handle 62 in a manner to be described below.

The nose assembly 60 of the tool 45, shown in FIGS. 4 and 6, has a cylindrical die 82 having a front tapering lead-in opening 84 for swaging the collar 36 as shown in FIG. 3. The die 82 has a cylindrical extension tube 83 that is connected to the front end 86 of the barrel 64 by a retaining nut (not shown) which threads onto the front end 86 of the barrel 64 and engages an annular lug 88 on the tube 83. A collet 90 slidably disposed in the tube 83 is internally threaded at its rear end and is threaded into the externally threaded front end 71 of the piston 70. The collet 90 has an internal tapering surface 92 that engages a three-piece segmented jaw 94 attached to an elastomeric tube 96 to form a "unitized" jaw assembly 98. The three pieces of the jaw 94 are disposed symmetrically around the axis 72 of the tool and are internally toothed to engage the grooves in the pintail 42. Retraction of the piston 70 pulls the collet 90 to the rear which tightens the jaws 94 on the pintail and exerts a tensile force on the lockbolt 30.

The installation tool 50, shown schematically in FIG. 5, includes a barrel 164 enclosing a cylinder 166 in which a piston 170 moves under influence of pressurized hydraulic fluid admitted to the cylinder 166 on one side or the other of the piston, as in the tool 45. A nose assembly 160 is attached to the front end of the barrel 164 and operates in the same manner as the nose assembly 60 on the tool 45. The barrel 164 is connected to an air-over-oil canister 165 by a handle 162, through which fluid flow lines 174 and 177 convey fluid for pressurizing and venting front and rear ends of the cylinder 166 for driving the piston 170 rearward for pulling the lockbolt and swaging the collar 36, and then returning the piston 170 forward for the next lockbolt installation.

Figure 8:
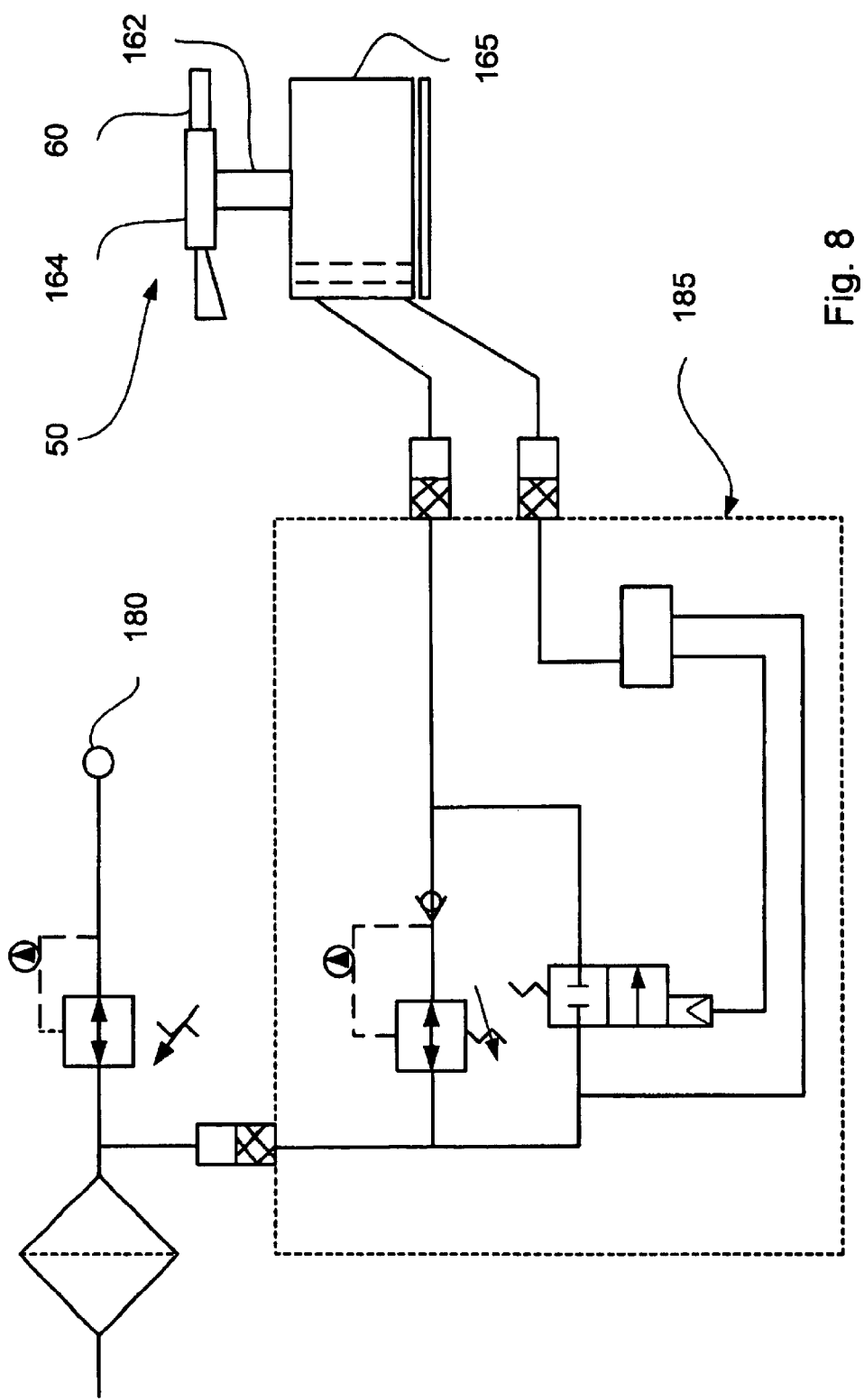
FIG. 8 is a schematic diagram of a pneumatic circuit for the tool shown in FIG. 5, having a dwell circuit used to provide the desired air pressure at the desired schedule to the tool.
Figure 9:
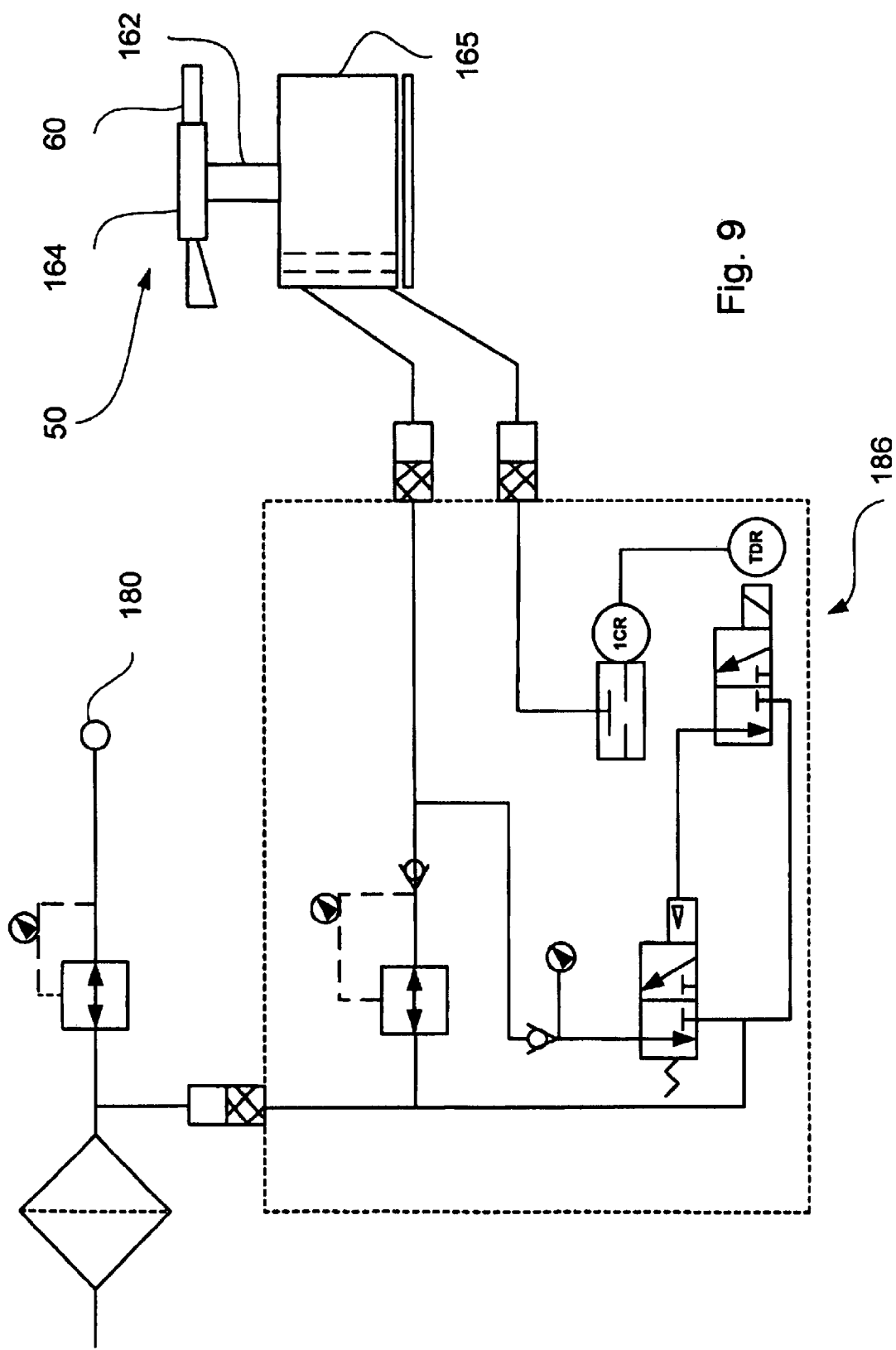
FIG. 9 is a schematic diagram an electro-pneumatic circuit for the tool shown in FIG. 5, having a dwell circuit used to provide the desired air pressure at the desired schedule to the tool.

The pistons 70 and 170 in the tools 45 and 50 shown in FIGS. 4 and 5, respectively, are energized by hydraulic pressure generated by power units 73 and 173 that use an electrically powered hydraulic pump or a pneumatically powered air-over-oil unit, respectively. The pneumatically powered tool 50 has a canister 165 built into the tool itself for the air-over-oil power unit 173. Both power units are provided with pressure regulators and adjustable pneumatic delay and electro/hydraulic delay circuits, respectively, to enable the fastener installation system to operate in accordance with this invention. These two systems will be described below in conjunction with FIGS. 7–9.

Figure 7:
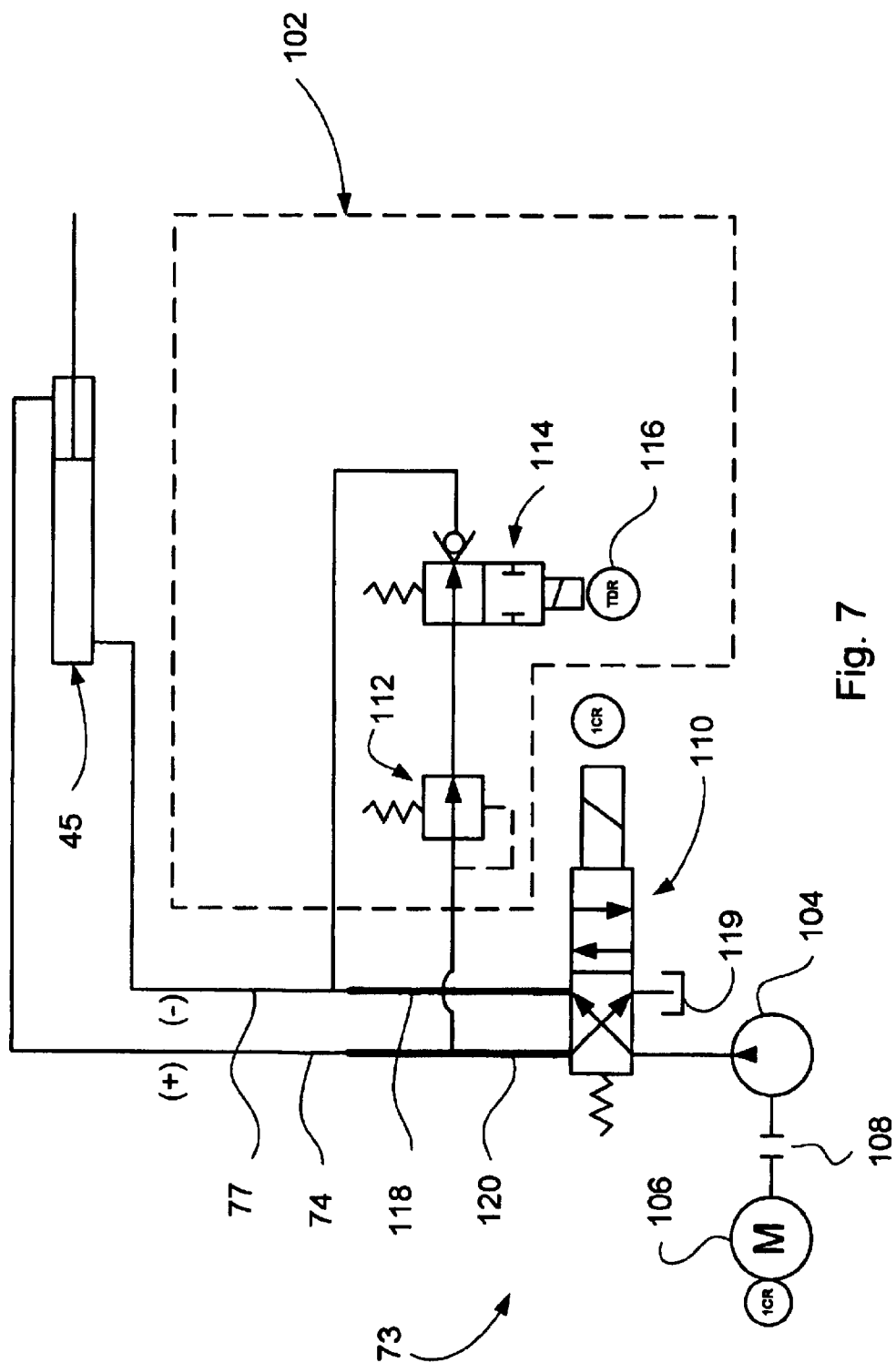
FIG. 7 is a schematic diagram of a power unit for the hydraulic tool shown in FIG. 4 having a dwell circuit in accordance with this invention.

Turning now to FIG. 7, the power unit 73 for generating pressurized hydraulic fluid to energize the tool 45 (shown only schematically in FIG. 7) is shown having an automatic pressure reduction dwell circuit 102 and a pump 104 driven by an electric motor 106 through a coupling 108. The output of the pump 104 communicates with the tool 45 and the pressure reduction dwell circuit 102 via a solenoid-operated valve 110.

The pressure reduction dwell circuit 102 includes a pressure regulator 112 such as a Enerpac model V-152, connected in series with a two-way solenoid valve 114 such as an Enerpac modular valve model VEK 15000B. The two-way solenoid valve 114 is actuated by a time delay relay 116 that is electrically actuated when the operator pulls the trigger 80 of the tool 45. In its un-energized position shown in FIG. 7, the valve 110 couples the pump 104 to a fluid line 118 coupled to the fluid hose 77 through which the hydraulic fluid pressurized in the pump 104 pressurizes the rear end of the cylinder 66 to push the piston 70 to its forward position. Simultaneously, the valve vents the front end of the cylinder 66 to a sump 119 through the fluid hose 74 and a fluid line 120. Pulling the trigger 80 electrically energizes the solenoid of the valve 110 to shift the valve from the position shown in FIG. 7 to the other position where the pump 104 communicates through the valve 110 to the fluid line 120 and the pressure hose 74 for conveying pressurized hydraulic fluid to the tool 45 for pressurizing the front end of the cylinder 66 to push the piston rearward in a pulling stroke.

Pressure reduction circuit 102 provides a vent to sump for pressure in excess of the pressure set by the adjustable pressure regulator 112, so the pressure passed to the tool 45 is the pressure set in the pressure regulator. The solenoid in the valve 114 is energized by the time delay relay 116 to hold the valve 114 in the position shown in FIG. 7 until the dwell time set in the time delay relay times out, at which time the valve 114 shifts to close the dwell circuit 112 and the pressure rises in the line 74 to the full value produced by the power unit 73. The time set for the valve 114 to remain in its open position, on the order of 2 seconds, is determined by analysis and confirming test to be that necessary to squeeze the sealant or other fluid in the assembly interface substantially out of the interface around the fastener hole, which is a layer of sealant about 0.006"–0.008" thick. At that thickness, there is insignificant additional squeeze-out and the tensile preload on the lockbolt is substantially unaffected by additional squeeze-out.

The pneumatic power unit 173 shown in FIG. 5 has an air-over oil canister 165 that converts air pressure to hydraulic pressure for operating the piston 170 in the tool 50. Air pressure is admitted from an air pressure source 180 through a pneumatic dwell unit 185, shown in FIG. 8 or an electro-pneumatic dwell unit 186 shown in FIG. 9. As shown in FIG. 5, the pressurized air is admitted to the bottom side of an air cylinder 188 in the air-over-oil canister 165 from an air pressure line 190 from the pneumatic dwell unit 185 or 186 through a valve 192 operated by a trigger 194. Simultaneously with the pressurizing of the air cylinder 188, air pressure from the source is admitted through the trigger valve 192 and a trigger line 196 to the dwell circuit 185. The air cylinder 188 has a piston 198 that is driven by air pressure in the cylinder 188.

Figure 10:
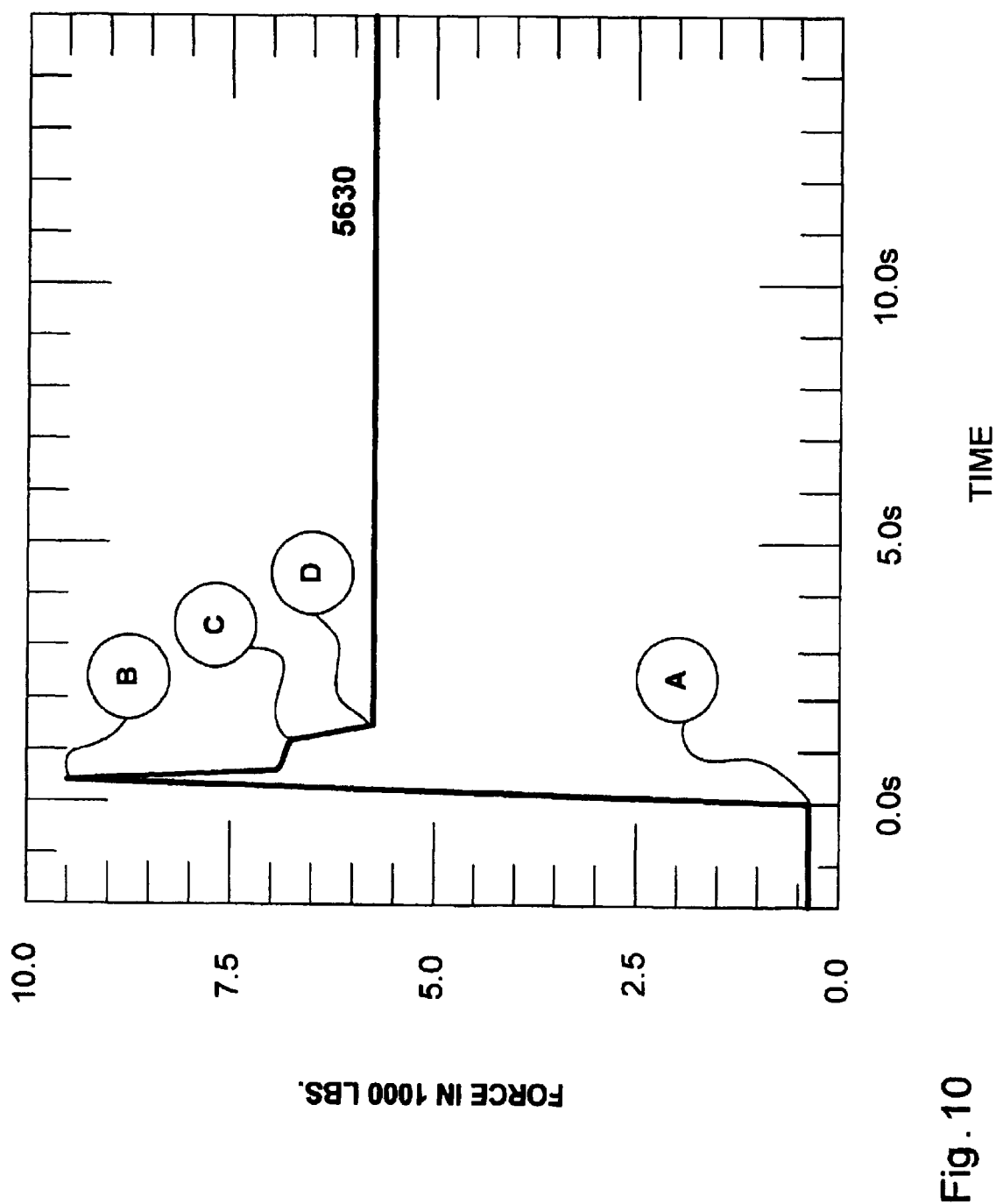
FIG. 10 is a graph showing the time distribution of force exerted on a lockbolt in a dry assembly by a prior art lockbolt pulling and swaging tool.

As shown in FIG. 10, at the start of the cycle in the conventional tool, the trigger of the tool is pulled at point A and full air pressure enters the tool to exert full force on the piston to tension the lockbolt and swage the collar. At point B, maximum pressure is attained in the cylinder and the pintail of the lockbolt is broken. At point C, the swaging die on the nose piece is removed from the swaged collar, which relaxes to the residual load at point D.

Figure 11:
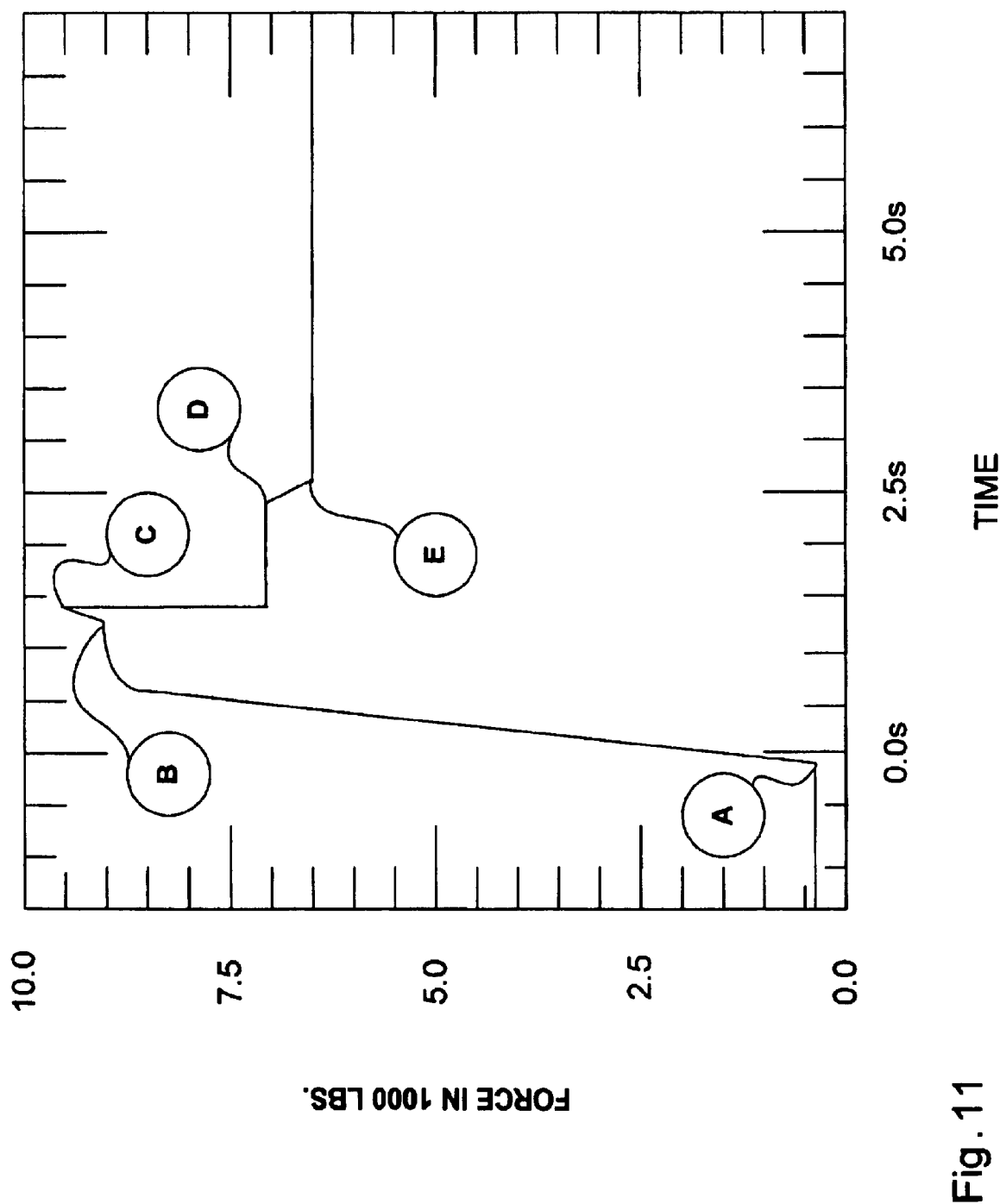
FIG. 11 is a graph showing the time distribution of force exerted on a lockbolt in a dry assembly by a lockbolt pulling and swaging tool in accordance with this invention.

In accordance with the invention as shown in FIG. 11, the tool's trigger is activated at A and regulated air pressure enters the tool and the timer is started. The lockbolt is pulled in and is held for predetermined time. Collar material 36 flows into the locking grooves 38 of the lockbolt 30. At point B, the timer times out and the main air line pressure regulator by-passes the pressure regulator and pulls in the lockbolt with maximum force, finishing the collar swaging and breaking the pintail 42 at point C. At point D, the swaging die 82 on the nose piece 60 is removed from the swaged collar 36, which relaxes to the residual load at point E.

Figure 12:
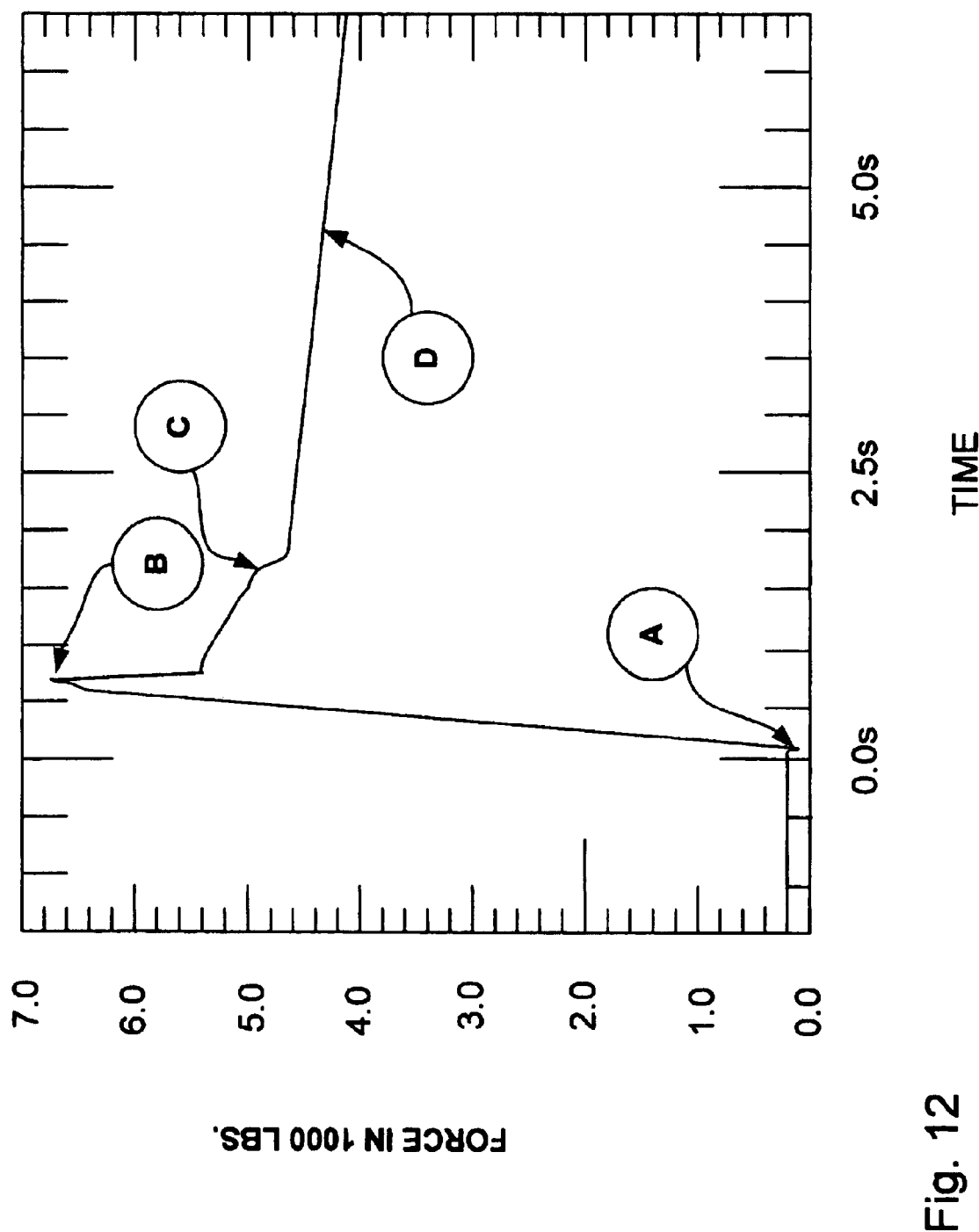
FIG. 12 is a graph showing the time distribution of force exerted on a lockbolt in an assembly with sealant in the interface by a prior art lockbolt pulling and swaging tool.

In FIG. 12, which represents a conventional installation of a lockbolt in an assembly with sealant in the interface between the faying surfaces of the parts, the trigger is pulled at point A, admitting full air pressure to the tool 50. Maximum pressure is reached at point B where the collar is swaged and the pintail breaks. The swaging die is removed at point C, but the lockbolt preload continues to decrease along D as sealant continues to squeeze out of the interface between the two parts of the assembly.

Figure 13:
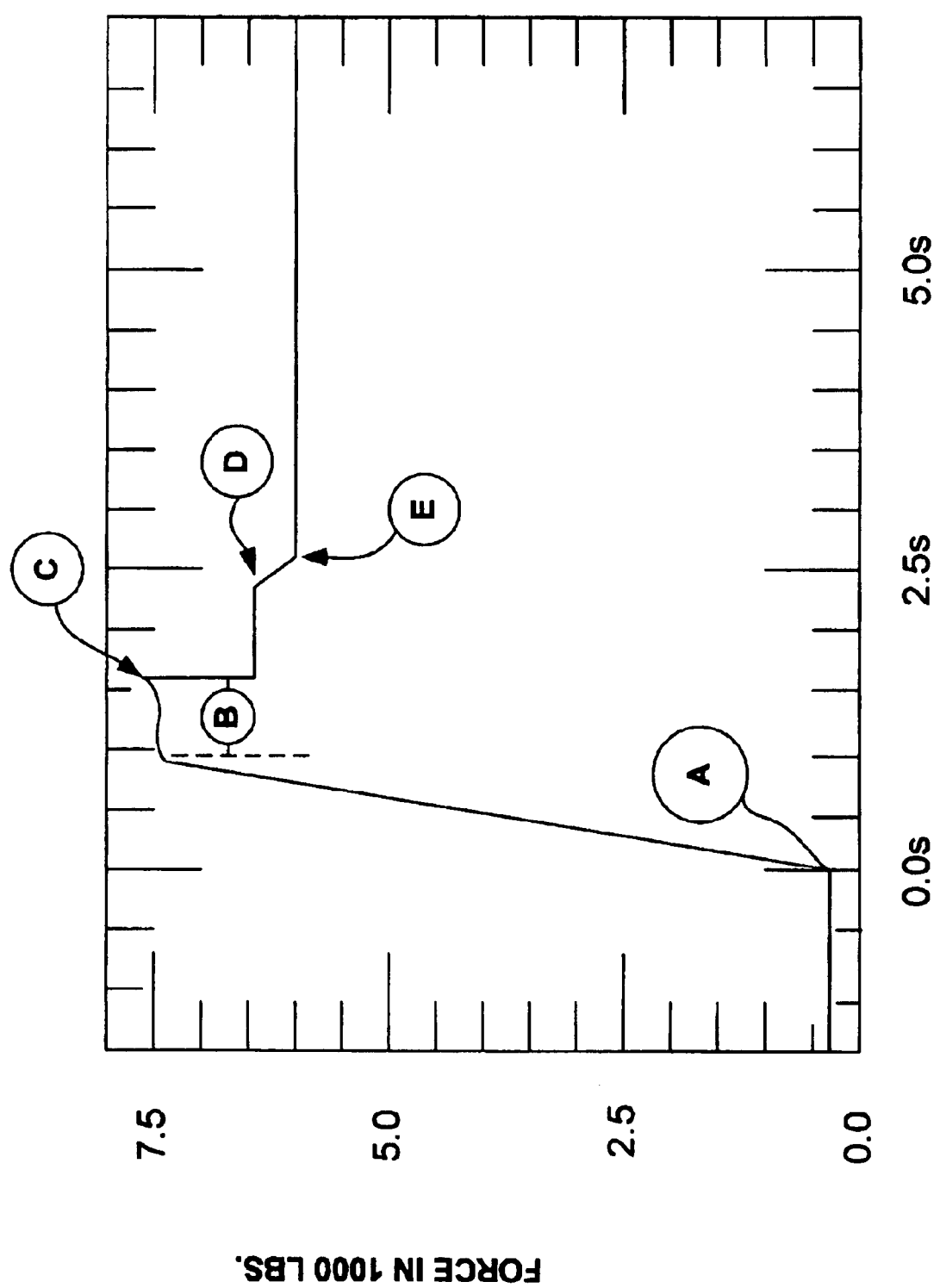
FIG. 13 is a graph showing the time distribution of force exerted on a lockbolt in an assembly with sealant in the interface by a lockbolt pulling and swaging tool in accordance with this invention.

In accordance with this invention, the installation of a lockbolt into an assembly with sealant in the faying surface of the interface, as illustrated in FIG. 13, starts when the trigger is pulled at point A. Regulated air pressure is admitted to the tool to the maximum pressure set in the pressure regulator, and that pressure is maintained during the dwell period shown in the period B. When the timer times out, full air pressure is applied to the tool, reaching maximum at point C when the pintail breaks. The swaging die is removed at point D and the collar relaxes to its residual load at point E.

An additional unanticipated benefit of the use of this invention is an improvement in the retained tensile preload of fasteners that is independent of the squeeze-out of sealant from the assembly interfaces. That is, the retained tensile preload on the fasteners is greater for fasteners secured using this invention for assemblies that do not use sealant as well as for those that do. Metallurgical analysis of lockbolt collars, partially swaged with a dwell at swaging pressure about 20 psi less than the pressure required to break the pintail before applying the final pressure, reveals that the grain size of the collars is larger than for collars swaged without the dwell, and that more collar material is displaced into the annular grooves or threads of the lockbolt, thereby distributing the load more uniformly on all the threads of the lockbolt. Also, the dwell period gives time for the tool to self-align on the axis of the fastener to ensure better coaxial alignment of the collar on the lockbolt.

Obviously, numerous modifications and variations of the preferred embodiment described above are possible and will become apparent to those skilled in the art in light of this specification. Moreover, many functions and advantages are described for the preferred embodiment, but in many uses of the invention, not all of the functions and advantages would be needed. Therefore, we contemplate the use of the invention using fewer than the complete set of noted features, benefits, functions and advantages. Moreover, several species and embodiments of the invention are disclosed herein, but not all are specifically claimed, although all are covered by generic claims. Nevertheless, it is our intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims, wherein we claim:

What is claimed is:

1. A method for installation of a lockbolt in a fastener hole in an assembly of at least two parts having an interface therebetween, said interface containing a viscous fluid such as adhesive or sealant, said installation comprising:

inserting a lockbolt, having a lockbolt pintail, into a fastener hole through said parts;

gripping said lockbolt pintail with a puller tool having grippers for gripping said lockbolt pintail;

energizing a power unit for delivering a supply of pressurized fluid to said tool;

reducing pressure in said pressurized fluid delivered through a fluid passage channels to said tool during a dwell period from a full pressure to a reduced pressure for a predetermined duration with a pressure reduction circuit in said power unit;

conveying fluid under pressure from said power unit to said tool via fluid passage channels from said power unit to said tool;

pulling on said lockbolt pintail in said fastener hole with a force of a predetermined intermediate magnitude corresponding to said reduced pressure in said pressurized fluid, and reacting said pulling force by pushing a collar against said assembly to exert a compressive force on said assembly against opposite sides of said assembly to squeeze said fluid out of said interface;

exerting said pulling force on said lockbolt pintail by way of a piston in a cylinder in said tool operable under influence of pressurized hydraulic fluid controlled by said power unit;

maintaining said pulling force at said intermediate magnitude for a precisely timed dwell period based on an optimal period;

increasing said pulling force after said dwell period by increasing fluid pressure on said piston in said cylinder, while simultaneously swaging said collar onto a threaded portion of said lockbolt to secure said collar on said lockbolt and secure said lockbolt in a state of tension in said hole in said assembly; and thereafter continuing to increase said pulling force and continue said collar swaging until said pintail breaks off said lockbolt.

2. A method for installation of a lockbolt as defined in claim 1, further comprising:

setting said precisely timed dwell period by setting an adjustable timer in a dwell circuit for controlling said duration of said dwell period.

3. A method for installation of a lockbolt as defined in claim 2, further comprising:

detecting commencement of a fastener installation sequence with an initiating sensor in said dwell circuit that starts the operation of said timer and said dwell period.

4. A method for installation of a lockbolt as defined in claim 2, wherein said pressure reduction includes:

regulating pressure of pressurized fluid of said power unit to said cylinder; and operating a valve by a signal from said timer for bypassing said pressure regulation and applying full fluid pressure from said power unit to said tool.

* * * * *